United States Patent [19]
Rothman et al.

[11] 3,878,230
[45] Apr. 15, 1975

[54] PROCESS FOR THE PREPARATION OF ENOL ESTERS OF STRAIGHT CHAIN CARBOXYLIC ACIDS

[75] Inventors: Edward S. Rothman, North Hills; Samuel Serota, Philadelphia, both of Pa.

[73] Assignee: The United States of America as represented by the Secretary of Agriculture, Washington, D.C.

[22] Filed: Dec. 15, 1972

[21] Appl. No.: 315,732

Related U.S. Application Data

[62] Division of Ser. No. 176,735, Aug. 31, 1971, Pat. No. 3,745,195.

[52] U.S. Cl........ 260/410.9 N; 260/497 R; 260/498
[51] Int. Cl............................................. C07c 67/04
[58] Field of Search.......... 260/410.9 N, 498, 497 R

[56] References Cited
UNITED STATES PATENTS
3,655,736   4/1972   Norton et al.................... 260/497 R Primary Examiner—Alton D. Rollins
Assistant Examiner—Diana G. Rivers
Attorney, Agent, or Firm—M. Howard Silverstein; Max D. Hensley; William E. Scott

[57] ABSTRACT

Methylacetylene and allene are equilibrated by contact with potassium hydroxide in an inert solvent such as t-butanol. When mixtures of methylacetylene and allene are used in a chemical reaction such as the preparation of isopropenyl stearate from stearic acid and zinc stearate is the sole catalyst, methyl acetylene is selectively absorbed by the stearic acid leaving behind highly purified allene. Alternatively, when potassium stearate is present with the zinc stearate and sufficient stearic acid is present, the allene-methylacetylene mixture is completely absorbed. The zinc stearate-potassium stearate co-function synergistically.

3 Claims, No Drawings

PROCESS FOR THE PREPARATION OF ENOL ESTERS OF STRAIGHT CHAIN CARBOXYLIC ACIDS

This is a division of application Ser. No. 176,735, filed Aug. 31, 1971, now U.S. Pat. No. 3,745,195.

A non-exclusive, irrevocable, royalty-free license in the invention herein described, throughout the world for all purposes of the United States Government, with the power to grant sublicenses for such purposes, is hereby granted to the Government of the United States of America.

Processes for the equilibration of allene-methylacetylene mixtures typically involving a gas-phase, thermally facilitated operation using a catalyst of alumina or silica activated by a variety of halogens or halogenated hydrocarbons are well known in the art (U.S. Pat. Nos. 3,268,614, 2,594,706 and 3,243,470 and French Patents 1,370,415 and 1,370,416). With one exception, U.S. Pat. No. 3,268,614, none of these closely similar procedures attempt the difficult separation of pure allene from such mixtures. The difficulties of separation arise not only because the boiling points of allene and methylacetylene are very close but also because they distill together in an azeotropic constant boiling mixture. The exception referred to above involves selective complex formation with copper halide and is too costly for commercial application.

In previous studies concerning the addition of stearic acid to methylacetylene to form the enol stearate, isopropenyl stearate (co-pending appl. Ser. No. 822,693, filed May 7, 1969, now U.S. Pat. No. 3,666,781), we were hampered by the problem that cheap, commercially available weldingtorch gases containing mixtures of allene and methylacetylene in about equal proportions were useful only for the methylacetylene content. The recycling of the allene was expensive since equilibration by known procedures gave only a fixed proportion of methylacetylene requiring an infinite geometric series for complete utilization.

An object of the present invention is to show that the known type of equilibration can be achieved much more simply than previously possible by using as catalyst potassium hydroxide in t-butanol or similar inert semi-solvent.

In general, according to this invention we have found that when both components of the equilibrium are used in a given chemical reaction such as the formation of isopropenyl stearate from stearic acid, it is possible to isomerize simultaneously the allene to methylacetylene and absorb this newly formed methylacetylene as rapidly as it is formed with stearic acid to form isopropenyl stearate. The continuously shifting equilibration occurs until, provided sufficient stearic acid is present, all of the allene-methylacetylene mixture is consumed. In order to achieve complete consumption of the allene-methylacetylene mixture the catalyst must be a mixture of zinc stearate and potassium stearate. The unusual and unpredictable synergism between these two stearates is an important facet of this invention because there is a total lack of reaction between stearic acid and allene when either catalyst is used alone. Furthermore, we have found that the selectivity of stearic acid for methylacetylene to the exclusion of allene is so marked that allene may be freed of any amount of methylacetylene provided that adequate stearic acid is present and that the catalyst be only zinc stearate.

So for, for the sake of simplicity, we have specified stearic acid. However acids from acetic to n-eicosanoic acid are suitable regardless of whether unsaturation is present or whether the acids are in a mixture such as those obtained from hydrolysed tallow of vegetable oils. The zinc stearate and potassium stearate can be conveniently prepared in situ by adding to an excess of melted stearic acid the calculated amount of zinc oxide and/or potassium hydroxide or similar basic salts capable of forming the required salts by neutralization.

We stated previously that the catalyst, potassium hydroxide, is in an inert solvent such as t-butanol. It is not strictly necessary that the solvent dissolve all the potassium hydroxide or even that the solvent be present at all, but only that the solvent be inert. Solvents such as n-octadecanol and similar ones of lower molecular weight absorb both allene and/or methylacetylene to form novel unsymmetrical isopropenyl alkyl mixed ethers such as isopropenyl octadecyl ether m.p. 29.5°–30°C. Ethers such as diethyl ether, dioxane, and tetrahydrofuran are suitable semi-solvents for the indicated isomerization.

The indicated reactions are typically carried out in pressure vessels at 150°C and 600 psi pressure at the indicated temperature for 4 to 20 hours reaction time. Occasionally, even much shorter times suffice. The examples that follow will show the deviations allowable from these conditions of time, temperature, and pressure without seriously affecting the yield.

The utility of methylacetylene has been well documented for enol ester synthesis. Allene essentially free of methylacetylene is useful as a starting material in the preparation of propargyl alcohol anticorrosive formulations and for polymer synthesis, for example, methyl methacrylate production and polymerized allene per se.

EXAMPLE 1 t-Butanol, 250 ml. and 27 g. of freshly powdered commercial reagent potassium hydroxide were heated with slightly more than a mole of pure allene in an autoclave pressurized to 350 psi with nitrogen at room temperature and heated to 150°C for 14 hours. The maximum developed pressure was 560 psi. Infrared assay of the gases showed the typical equilibrium proportion of majority component methylacetylene and minority component allene.

EXAMPLE 2

Stearic acid, 282 g. (1 mole), and 30 g. of zinc stearate were melted in an autoclave to a single phase and the vessel was sealed and well purged with nitrogen. Propyne (methylacetylene) 16 g. (0.4 mole) and allene 16 g. (0.4 mole) were introduced via a pressure burette with nitrogen backup pressure, the vessel was heated to 150°C, and pressurized to 600 psi with additional nitrogen. After 14 hours, the condensable head gases were verified by infrared analysis to be pure allene with only a trace of propyne. (Allene shows strong bands at 5.15 and 5.9 microns in the gas infrared cell-regions of transparency for propyne; propyne bands at 4.7 microns were practically absent - a region of allene transparency thus enabling an accurate assay.)

EXAMPLE 3

A pressure vessel was charged with 105 g. of stearic acid and 7 g. of potassium hydroxide with stirring until solution occurred. The vessel was then purged with nitrogen and sealed. 0.75 mole of liquid pure allene was added via a pressure burette having a back nitrogen pressure of 340 psi. The vessel was heated to 150°C for 12 hours and then cooled. Examination of the vessel contents showed only the presence of the starting materials allene and stearic acid and catalyst; methylacetylene and ester were absent.

EXAMPLE 4

A pressure vessel was charged with stearic acid, 282 g. (1 mole), potassium hydroxide, 27 g. (0.5 mole approx.), and zinc stearate, 42 g. Heat was generated during the neutralization causing vigorous expulsion of steam. The vessel was sealed and flushed with nitrogen and then 0.24 moles of allene and 0.24 moles of methylacetylene were added at 150°C using a back pressure of 600 psi to force the hydrocarbons into the vessel. After 17 hours, analysis of the head gas showed only traces of hydrocarbon in the head space indicating total conversion to isopropenyl stearate. Isolation of isopropenyl stearate, 160 g., confirmed the analysis.

EXAMPLE 5 n-Octadecanol, 268 g. (1 mole), powdered potassium hydroxide, 2.7 g. (.05 mole) and 1 mole of allene were heated to 150°C for 24 hours to yield the new compound n-octadecyl isopropenyl mixed ether. The allene was totally consumed. The product was isolated by extraction with hexane-water mixture. The hexane was dried and very rapidly filtered through a short magnesium silicate column. Crystallization gave the product, m.p. 29.5°–30°C, $\bar{\nu}_{max}^{neat.}$ . 3125, 1627, 1588, 1458/1469 doublet, 1379, 1366, 1282, 1085, 794, 716 cm$^{-1}$.

EXAMPLE 6

Results identical to those of example 5 were obtained using a mole of propyne instead of a mole of allene.

We claim:

1. A process for preparing enol esters of from 5 to 23 carbon atoms comprising reacting a member of the group consisting of saturated and unsaturated straight chain carboxylic acids having from 2 to 20 carbon atoms and mixtures of said carboxylic acids with a mixture of methylacetylene and allene in the presence of a catalyst consisting of a mixture of zinc stearate and potassium stearate, said mixture cofunctioning synergistically and effecting a complete consumption of said mixture of methylacetylene and allene and forming an isopropenyl ester.

2. The process of claim 1 wherein the enol ester is isopropenyl stearate and the member of the group is stearic acid.

3. The process of claim 2 wherein the reaction is conducted at about 150°C. under 600 p.s.i. pressure for about 17 hours.

* * * * *